Feb. 5, 1957  W. F. MARZLUFF  2,780,513
REMOVAL OF HCN
Filed Feb. 8, 1954
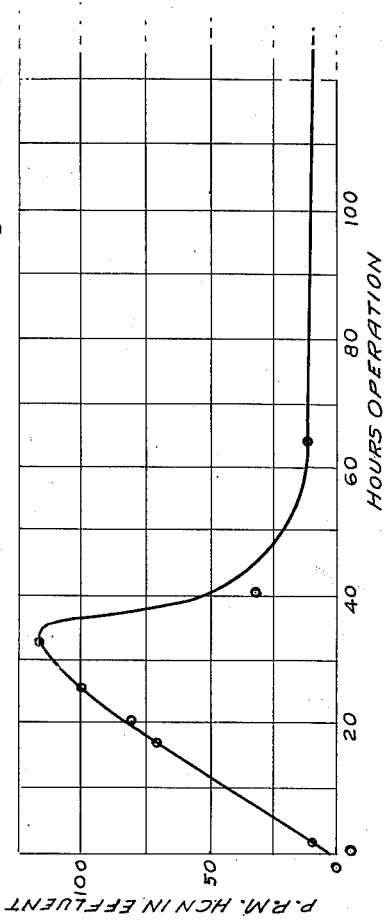
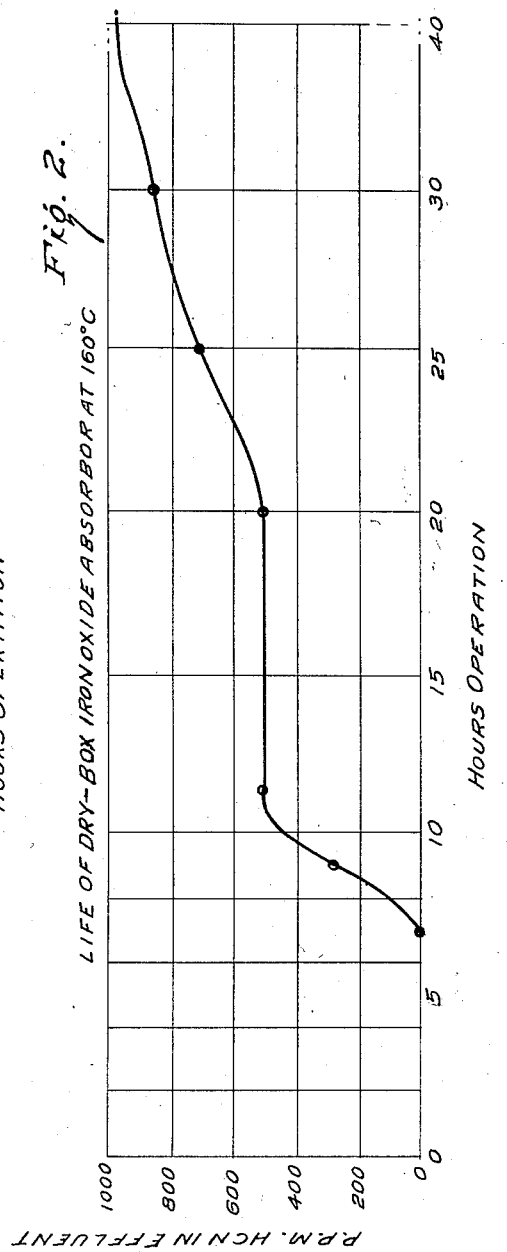
INVENTOR
WILLIAM FRANK MARZLUFF,
BY
ATTORNEY

United States Patent Office 2,780,513
Patented Feb. 5, 1957

2,780,513
REMOVAL OF HCN

William Frank Marzluff, Stamford, Conn., assignor to American Cyanamid Company, New York, N. Y., a corporation of Maine Application February 8, 1954, Serial No. 408,634

6 Claims. (Cl. 23—2)

This invention relates to gas purification and more particularly to the dry purification of mixtures of ammonia and carbon dioxide containing hydrogen cyanide by continuously removing the latter.

The presence of hydrogen cyanide in small concentrations in the recycle gas from a urea-to-melamine synthesis is undesirable and troublesome due to the possibility of polymerization of hydrogen cyanide in the pipe lines and in the compressors. The need for effective and efficient removal of hydrogen cyanide from a mixture of ammonia and carbon dioxide has been ever present. One probable equation representing a urea-to-melamine reaction shows the source of the ammonia and carbon dioxide off-gases and is represented as follows:

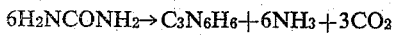

$$6H_2NCONH_2 \rightarrow C_3N_6H_6 + 6NH_3 + 3CO_2$$

However, ammonia in excess of the amount shown in the formula above is also present due to ammonia which is used to dissolve the urea and is fed to the reactor along with the urea. Small amounts of hydrogen cyanide are apparently formed from melamine coming in contact with hot reactor surfaces.

It is an object of this invention to provide an efficient and economical method for the removal of hydrogen cyanide from a mixture of effluent gases containing ammonia and carbon dioxide and small amounts of hydrogen cyanide which emanate as an effluent gas in the urea-to-melamine synthesis.

In general the object of this invention is accomplished by utilizing a mixture of ferric oxide and alkaline earth carbonates as an absorbent for hydrogen cyanide from a mixture of ammonia and carbon dioxide gases. The effectiveness of this mixture is highly surprising in view of the fact that either component alone is quite useless.

The effectiveness of this mixture in use is illustrated in the accompanying drawing in which Fig. 1 graphically shows the amount of hydrogen cyanide remaining in an effluent gas mixture of ammonia and carbon dioxide. After a short induction period of about 32 hours, the amount of hydrogen cyanide in the effluent rapidly decreases using the absorbent of the invention. Fig. 2 shows a comparative run in which the hydrogen cyanide in the effluent gases increases after 32 hours and continues to increase when an iron oxide absorbent is employed.

Up to the present, dry-box iron oxide (i. e., ferric oxide on wood), magnetite ($FeO \cdot Fe_2O_3$), magnesium hydroxide and sodium carbonate were employed to remove hydrogen cyanide. However, the latter were all found to be ineffective as absorbers of hydrogen cyanide from the recycle gases at temperatures as high as 250° C., because they are rapidly contaminated. The presence of traces of hydrogen cyanide in the recycle gases of the urea-to-melamine reaction presented a problem.

According to this invention, it has been found that hydrogen cyanide can be effectively removed from the anhydrous recycle gases of ammonia and carbon dioxide which contain not more than 0.3% of hydrogen cyanide based on the total volume of the gas mixture, by continuously passing these gases over a mixture of ferric oxide and alkali or alkaline earth carbonate at temperatures between 200°–300° C., inclusive, whereby substantially all the hydrogen cyanide is absorbed and recovering a mixture of ammonia and carbon dioxide substantially free from hydrogen cyanide. Surprisingly, the absorbent is still effective after as much as 1000 hours of service.

In the absorbent of the present invention, the ratio of iron oxide to carbonate may be maintained at 10–90% by weight of ferric oxide and 90–100% carbonate, However, a preferred mixture is in the intermediate range of from about 60–70% $Fe_2O_3$ and from about 40–25% of carbonate. A 70% to 30% ratio of ferric oxide to carbonate is excellent.

The absorbent may be in a pellet or powder form. Further, any alkali or alkaline earth metal carbonate appears to be operative in my process. As illustrative of said metal carbonates, sodium, lithium, potassium, calcium and barium carbonates are within the scope of this invention.

Excessively sharp temperature control is not necessary. The operative range of temperature for the process of this invention may vary from about 200° to about 300° C. or even higher. However, again a narrower range is generally used. The preferred range is between 225° and 255° C.

I have found that the absorbent of this invention becomes substantially contaminated and rendered ineffectual after 1500 hours of use. It may either be discarded and replaced with a fresh mixture or revivified by methods well known in the art, such as air oxidation.

I have further found that at 225° C., when a mixture of about 90% ammonia, 10% carbon dioxide and 0.1% hydrogen cyanide (1000 parts per million) is passed over an absorbent of the invention, more than 90% of hydrogen cyanide is removed from the gas mixture after a short induction period as shown in Fig. 1. No decrease in the absorbent activity of the absorber (i. e., mixture of ferric oxide and carbonate) is noted even after 1000 hours of use. However, in a comparative run where $FeO_3$ is used alone, the absorber is of little value after 20 hours, since appreciable amounts of hydrogen cyanide are passed along with the effluent gases of ammonia and carbon dioxide which are continuously passed over the absorbent. Fig. 2 of the drawing is exemplary of the low rate of absorption of hydrogen cyanide after a run of about 32 hours, using ferric oxide alone. Similarly, when sodium carbonate pellets are exposed to the gas containing 0.1% hydrogen cyanide the absorption of hydrogen cyanide decreased from 70% to 0% in 3 hours, thus rendering that absorbent ineffectual. Accordingly the latter absorbents as well as other prior art absorbents are uneconomical and commercially unfeasible.

The following examples are further illustrative of this invention. In these, 3.6 pounds of absorbent materials are employed. However, I have found that from about 1 to 10 pounds of absorbent is equally effective. The amounts of absorbent used, will of course, depend upon the volume of gas passed thereover in a given time interval.

Example 1

Over a pelleted mixture of 70% ferric oxide and 30% sodium carbonate is passed continuously in a conventional absorption apparatus at the rate of 1 liter per minute, an anhydrous gas mixture comprising approximately about 90% ammonia, 10% carbon dioxide and 0.1% hydrogen cyanide. The temperature in the absorption apparatus is maintained at about 225° C. Hydrogen cyanide is removed from said gas after 1000 hours of operation. This was continued for an additional 500 hours with the continuous removal of hydrogen cyanide resulting in an effluent gas substantially free from hydrogen cyanide. After 1500 hours, it is observed that the effluent gas contains substantial amounts of hydrogen cyanide. Accordingly, the process is interrupted, the absorbent revivified by air oxidation and reused in the process.

*Example 2*

Example 1 is repeated except the temperature of the apparatus increased to 255° C. During the 1500 hour period, as much as 99.5% of the hydrogen cyanide is removed from the incoming gas mixture.

*Example 3*

In this example, potassium carbonate is substituted for sodium carbonate of Example 1 and is repeated. The effluent gases are substantially free from hydrogen cyanide in that as much as 99% of hydrogen cyanide is removed from the incoming gases over a period of about 1500 hours.

*Example 4*

Example 1 is repeated except that calcium carbonate is substituted for the sodium carbonate. As much as 98% of hydrogen cyanide is removed.

*Example 5*

Over a pelleted mixture of 30% ferric oxide and 70% sodium carbonate is passed continuously in a conventional absorption apparatus at the rate of one liter per minute, an anhydrous gas mixture comprising approximately about 80% ammonia, 20% carbon dioxide and 0.1% hydrogen cyanide. The temperature in the absorption apparatus is maintained at about 235° C. Hydrogen cyanide is removed from the incoming gases. As additional incoming gas is passed into the absorption apparatus and contacts the absorbent, as much as 93% of the hydrogen cyanide is removed from said gas. After 1300 hours of operation, the process is interrupted, the absorbent removed, fresh absorbent is added and the process repeated.

While the examples are directed to a gas mixture containing about 0.1% hydrogen cyanide, slightly smaller and larger amounts may be used. Thus, for example, as much as 0.3% of hydrogen cyanide based on volume of the mixture may be present in the gas mixture. However, if substantially larger amounts are contained in the gas mixture, the hydrogen cyanide renders the absorbent ineffectual in a short time period.

I claim:

1. In a method for continuously removing hydrogen cyanide from an anhydrous gas mixture consisting essentially of ammonia, carbon dioxide and not more than 0.3% hydrogen cyanide, the steps which include passing said gas over an absorbent consisting of a mixture consisting of 10% to 90% by weight of ferric oxide and 90% to 10% by weight of a metal carbonate, said metal being selected from the group consisting of alkali and alkaline earth metals at a temperature of from about 200-300° C. for not more than about 1500 hours whereby substantially all the hydrogen cyanide is absorbed and recovering a mixture of ammonia and carbon dioxide substantially free from hydrogen cyanide.

2. In the method according to claim 1 wherein the absorbent is a pelleted mixture consisting of ferric oxide and sodium carbonate.

3. In the method according to claim 1 wherein the absorbent is a pelleted mixture consisting of ferric oxide and potassium carbonate.

4. In the method according to claim 1 wherein the absorbent is a mixture consisting of ferric oxide and calcium carbonate.

5. In the method according to claim 1 wherein the absorbent is a mixture consisting of 70% ferric oxide and 30% sodium carbonate.

6. In the method for continuously removing hydrogen cyanide from an anhydrous gas mixture consisting essentially of about 10% carbon dioxide, 90% ammonia and 0.1% hydrogen cyanide, the steps which include continuously passing said gas at the rate of 1 liter per minute over 3.6 pounds of absorbent consisting of a mixture of 70% ferric oxide and 30% metal carbonate, said metal being selected from the group consisting of alkali and alkaline earth metals at a temperature of from about 225°–255° C. whereby substantially all the hydrogen cyanide is absorbed, continuing passing said gases over the absorbent for 1500 hours, and recovering an effluent of ammonia and carbon dioxide substantially free from hydrogen cyanide.

References Cited in the file of this patent

UNITED STATES PATENTS

| | | |
|---|---|---|
| 292,341 | MacDougall | Jan. 22, 1884 |
| 1,809,990 | Seil | June 16, 1931 |
| 1,818,615 | Gluud | Aug. 11, 1931 |
| 1,895,601 | Beuthner | Jan. 31, 1933 |
| 2,110,240 | Roelen | Mar. 8, 1938 |
| 2,208,029 | Heckman | July 16, 1940 |